(12) United States Patent
Korpi et al.

(10) Patent No.: US 6,636,528 B1
(45) Date of Patent: Oct. 21, 2003

(54) METHOD FOR OPERATING A SWITCHING DEVICE UPON UTILIZATION OF DIFFERENT SIGNALING PROTOCOLS AND APPARATUS THEREFOR

(75) Inventors: Markku Korpi, Starnberg (DE); Guy Coen, Aalst (BE); Harald Mueller, Gilching (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/415,368

(22) Filed: Oct. 8, 1999

(51) Int. Cl.⁷ .............................................. H04L 12/50
(52) U.S. Cl. ....................... 370/467; 370/466
(58) Field of Search ................ 370/464, 466, 370/467

(56) References Cited

U.S. PATENT DOCUMENTS

| | | | |
|---|---|---|---|
| 6,067,302 A | * 5/2000 | Tozuka | 370/464 |
| 6,256,379 B1 | * 7/2001 | Gillespie | 379/230 |
| 6,278,697 B1 | * 8/2001 | Brody et al. | 370/466 |
| 6,414,953 B1 | * 7/2002 | Lamarche et al. | 370/466 |

* cited by examiner

Primary Examiner—Salvatore Cangialosi
(74) Attorney, Agent, or Firm—Staas & Halsey LLP

(57) ABSTRACT

A method for operating a switching device utilizing different signaling protocols. A terminal device is connected to a switching device with the assistance of an interface unit for protocol conversion. Signaling commands that correspond to a signaling protocol employed in the switching device are "tunneled" between the interface unit and the terminal device.

12 Claims, 4 Drawing Sheets

METHOD FOR OPERATING A SWITCHING DEVICE UPON UTILIZATION OF DIFFERENT SIGNALING PROTOCOLS AND APPARATUS THEREFOR

BACKGROUND OF THE INVENTION

The present invention is directed to a method wherein a switching device switches data connections in a telecommunication network. A first protocol for signaling control instructions is employed between a control means for controlling the switching device and a first terminal unit.

The switching device, for example, is an exchange of a telephone network or a telecommunication system to which system telephones are connected. An example of a telecommunication system is the system HICOM of Siemens AG. For example, terminal equipment of the type OPTISET are connected to the HICOM. A protocol defined by the manufacturer of the telecommunication system is employed between the control means of the HICOM and the OPTISET terminal equipment, namely the protocol Cornet-TS and Cornet-TC. The terminal units of the OPTISET type are connected to the switching device via an interface unit. However, no protocol conversion is implemented in this interface unit because the signaling protocol defined for the switching device is already matched to the terminal equipment. The connection via such an interface unit is therefore referred to below as direct connection to the switching device.

The telecommunication system relies on the switching device when speech data is transmitted in a voice channel. The switching equipment switches connections between various speech channels over the duration of a conversation. In the simplest case, a voice channel is formed by a line that is only used for a single connection. Analog or digital voice data, without interruption by information for called control, is exchanged via the line. Usually, however, the voice data belonging to different connections is transmitted on a line or on a radio transmission path by time-division multiplex method. A time section within time frames following one another in time is defined for each connection for the transmission of the voice data.

In data transmission networks, too, for example the Internet or an Intranet wherein data are transmitted in data packets, there is switching equipment that forward the data packets in various directions dependent on an identifier in the header of the data packet. A data packet usually contains a number of data words with a predetermined number of bit places, for example what are referred to as octets with eight bit places. In general, octets that belong to the data head can be distinguished in a data packet. In addition to data for indicating the destination of the data packet, for example, the data header also contains data that define, the type of data packet. In addition to the data header, there are usually data words that contain the payload information, for example the voice data. Data words are also transmitted that form an end section of the data packet and, for example, contain a check sum for error recognition and error correction. A separate signaling protocol is specified for the data transmission network.

When connections are to be set up between terminal units that are located in different networks, i.e. for whose operation different signaling protocols are also employed, then a transition means is usually employed between the networks. Such transition means are also referred to as gateways. The gateway makes functions available for all lower layers of what is referred to as the OSI reference model (open systems interconnection), for instance for the bit transmission layer, the security layer, the switching layer and the transport layer. The signaling protocols are also converted in the gateway.

SUMMARY OF THE INVENTION

An object of the present invention is to provide a simple method for the operation of a switching device with terminal equipment that works according to different signaling protocols. Moreover, terminal units and systems are provided for implementation of the method.

This object is achieved in accordance with the invention in a method of switching data in a telecommunication network with a switching device. The switching device is controlled by a first control unit. A first protocol signals control commands between a first control unit and a first terminal unit. The first control unit is connected to a second terminal unit via an interface unit. A second protocol different from the first protocol for signaling control commands between the interface unit and the second terminal unit is employed. Control commands are received at the interface unit from the control unit according to the first protocol are embedded into control commands according to the second protocol. The embedded control commands are sent to the second terminal unit. Control commands according to the first protocol from control commands received at the interface unit from the second terminal unit according to the second protocol are sent to said control unit.

The invention proceeds from the consideration that, given employment of the known transmission units, the signaling protocols to each network adjoining the transmission unit must be completely terminated, i.e. that corresponding confirmations in response to demands and corresponding replies in response to messages are to be generated. A complete adaptation of the signaling instructions can only be realized with extremely great outlay. Given employment of the network transition, specific performance features can usually not be used that are exclusively employable in one of the two networks during a signaling.

The present invention is also based on the perception that these problems do not occur when commands according to the signaling protocol of the other network are already generated in a terminal equipment of the one network, and these commands are "tunneled" to the switching device, i.e. the commands according to the signaling protocol of the other network are embedded into commands of the signaling protocol of the network wherein the terminal equipment is operated.

In the inventive method, the control unit of the switching device is therefore connected via an interface unit to a second terminal unit. A second protocol that differs from the first protocol is employed for signaling control commands between the interface unit and the second terminal unit. The interface unit embeds control commands received from the control unit according to a first protocol into control commands according to the second signaling protocol and sends this to the second terminal unit. Instead of or in addition to these procedures, the interface unit takes control commands according to a first protocol from the control commands received from the second terminal unit according to the second protocol and sends these to the control unit of the switching device. This means that the control commands according to a first signaling protocol had been previously embedded into signaling commands according to the second protocol in the second terminal equipment.

What the tunneling achieves is that, given specific changes of the first signaling protocol, no modifications need be undertaken in the interface unit. For example, a new command word can be determined without modification of the interface unit that the interface unit embeds together with the previously employed command words in control commands according to the second signaling protocol or that are taken from control commands according to the second signaling protocol. Modifications are only to be implemented in the switching device and in the terminal equipment.

What the tunneling also achieves is that the switching device control, the terminal unit or the terminal unit controls the exchange in network-overlapping fashion in the manner of a hidden remote control. The performance features of the switching equipment can thereby be completely used in the signaling between terminal unit and switching equipment.

The interface unit given the inventive method is driven by the switching device in the same way as the first terminal unit. The interface unit also signals to the switching device in the same way as the first terminal equipment. Modifications in the switching device are therefore not required given connection of the interface unit. In the direction toward the second terminal unit, by contrast, the interface unit looks like a terminal unit of the data transmission network in which signaling is carried out according to the second signaling protocol.

In an embodiment, the first protocol is a stimulus protocol with whose assistance statuses of operating elements of a terminal unit are reported to the control unit and/or with whose assistance statuses of signal elements of a terminal unit can be set by the control unit. The terminal equipment thus requires no information about call, control and type of performance features. The performance features are defined in the switching device. The terminal units can thus be simply constructed. What is achieved by the tunneling is that performance features defined network-specifically can also be completely utilized proceeding from another network.

In an embodiment, the second protocol is a functional protocol that, dependent on a function selected in a terminal unit or on a function to be carried out by a terminal unit, requires a command defined for this function. In this case, a special command of the functional protocol is defined for the tunneling. With this command, commands according to stimulus protocol or according to some other functional protocol are tunneled in the interface unit.

In an embodiment, the transmitted commands are searched in the interface unit for commands that require the setup or the cleardown of a payload data connection between the switching device and the second terminal unit. Given the occurrence of a sought command, the interface unit initiates the setup or the cleardown of the payload data connection.

This last embodiment is based on the consideration that the interface unit is to work in the direction toward the switching device like a first terminal equipment, i.e. a terminal equipment directly connectable to the switching device. In the direction toward the second terminal unit, the interface unit should work exactly like a terminal unit of the second network. This can be achieved when, in addition to the signaling protocol, the payload data connection is also processed in the interface unit. The setup or cleardown of the payload data connection is usually implemented by hardware in the switching device. This hardware, however, cannot be used for the setup of a payload data connection to another network. The interface unit therefore assumes this job.

The same method steps as for a connection to the first terminal unit are implemented in the switching device for the signaling and the payload data connection to the second terminal equipment. Additional method steps need not be carried out. What is thus achieved is that no additional resources are required in the switching device given a connection to a second terminal unit compared to a connection to the first terminal unit, i.e. no additional signaling connections and no additional payload data connections. The switching device can thus be used for a number of connections to terminal units that work according to the second signaling protocol.

When, given an embodiment in the interface unit, data transmitted by the switching device in a data channel is distributed onto data packets and is transmitted to this terminal unit according to a transmission protocol defined for the second terminal unit, then the interface unit is an interface between a data transmission network, wherein the data is transmitted in voice channels, and a data transmission network, wherein the data is transmitted in data packets. In the other direction, data packets coming from the second terminal equipment are unpacked in the interface, and the unpacked data are forwarded to the switching device in a data channel. The transmission of data in a data channel is employed, in particular, for the transmission of voice data because voice data use, a voice channel well. By employing the interface unit, the voice data, however, can also be transmitted in data transmission networks wherein data other then voice data is mainly communicated, for example document data files, program data files or table calculation data files.

In an embodiment, the inventive method is utilized for a second terminal unit that works according to ITU standard (International Telecommunication Union) H.323 "Packed-Based-Mutlimedia Communication Systems". In this case, performance features of the switching device can be used in the second terminal unit without greater outlay. One need not wait until standards based on the standard H.323 have been developed for these performance features. See, for example, Standard H.450.1 "Generic Functional Protocol for the support of supplementary services in H.323" and Standard H.450.2 ff.

The present invention is also directed to an interface unit that is suitable for the implementation of the inventive method or the embodiments thereof. In particular, the inventive interface unit is utilized in a switching device. Further, the present invention is directed to a program for the execution of the inventive method or the embodiments thereof. The technical effects cited above for the inventive method and the embodiments thereof also apply to the interface unit, the switching device and the program.

The present invention is also directed to a method comprising the method steps of transmitting control commands in a signaling unit of a second terminal unit according to a first signaling protocol being employed between a switching device and a first terminal unit directly connected to said switching equipment; transmitting control commands at a connection of said signaling unit connected to a data transmission network according to a second signaling protocol different than said first signaling protocol; embedding control commands generated in said signaling unit by said second terminal unit according to said first signaling protocol in control commands according to said second signaling protocol; sending said embedded control commands to said first terminal unit; receiving control commands according to said first signaling protocol in said signaling unit from control commands according to said second signaling protocol received at said terminal; and processing said received control commands in said second terminal unit.

These method steps relate to the second terminal unit and are closely technologically related to the method steps of the first-cited inventive method. The technical effects cited above for the first inventive method and the developments thereof thus also apply to the second inventive method. The present invention is also directed to a terminal unit and to a program that are suitable for the implementation of the second inventive method.

These and other features of the invention are discussed in greater detail below in the following detailed description of the presently preferred embodiments with reference to the accompanying drawings.

DETAILED DESCRIPTION OF THE PRESENTLY PREFERRED EMBODIMENTS

Figure 1:
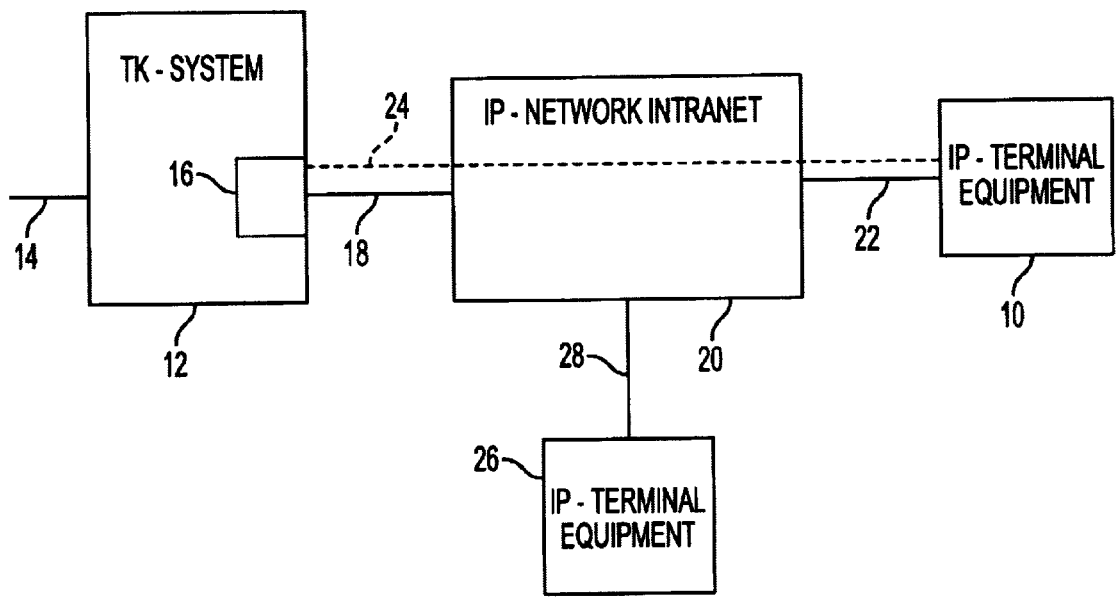
FIG. 1 is a block diagram showing the connection of a packet-based terminal device to a telecommunication system.

FIG. 1 shows a terminal device 10 working packet-based that is connected to a telecommunication system 12. The terminal device 10 works essentially according to ITU-T Standard H.323. As a transmission protocol, the terminal device 10 uses the Internet protocol IP/TCP (Internet Protocol/Transmission Control Protocol). A unit (not shown in FIG. 1) of the terminal device 10 serves for voice input and for voice output. Voice data is generated in the terminal device 10 from the input voice signals, this being distributed onto data packets and sent to the telecommunication system 12. On the other hand, data received by the terminal device 10 in data packets is in turn converted into voice signals and output.

The telecommunication system 12 is a line switching system center telecommunication system in which voice channels are connected for the duration of a call. The telecommunication system 12 is connected via exchange lines 14 to a digital exchange in the public telephone network, for example in the telephone network of TELE-COM AG. A line/trunk group 16 in the telecommunication system 12 enables operation of the terminal device 10 at the communication system 12. The structure of the line/trunk group 16 is explained below with reference to FIG. 2. A line 18 that belongs to an Intranet 20 is connected to the line/trunk group 16. The Intranet 20 serves a private company both for internal data transmission as well as for internal voice transmission. The data are transmitted according to the protocol IP/TCP in the Intranet 20.

The Intranet 20 also includes a line 22 to whose one end the terminal device 10 is connected. From the terminal device 10 via the line 22, the Intranet 20 and the line 18 can therefore set up a connection 24 to the telecommunication system 12. FIG. 1 also shows a terminal device 26 that is connected to the Intranet 20 with the assistance of a line 28. The terminal equipment 26 likewise works according to ITU-T Standard H.323.

Figure 2:
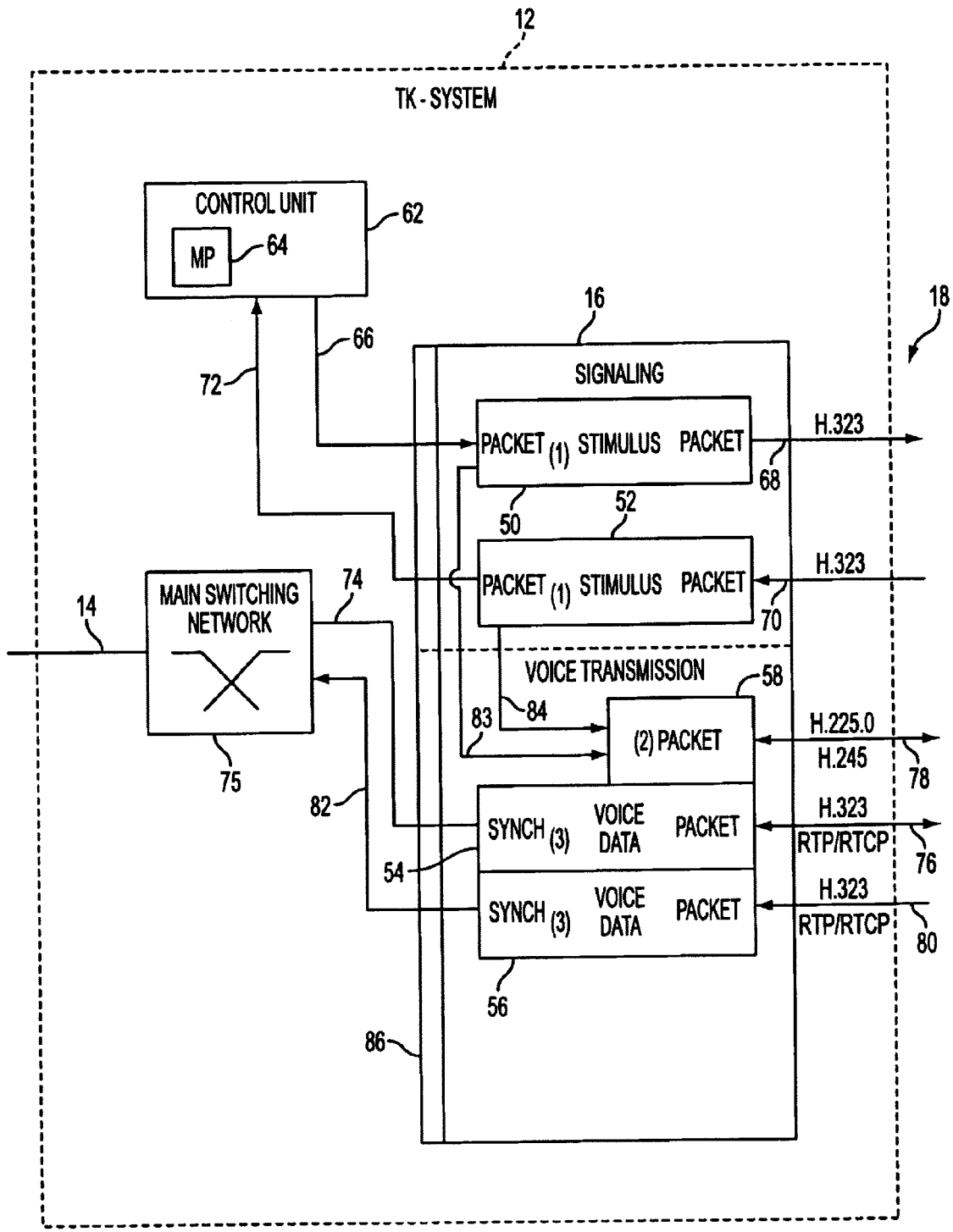
FIG. 2 is a block diagram showing the structure of a line/trunk module for the connection of the packet-based terminal device to the telecommunication system.

FIG. 2 shows the structure of the line/trunk group 16 that is accommodated in the telecommunication system 12. The line/trunk group 16 contains two signaling units 50 and 52, two voice transmission units 54 and 56 as well as a connection unit 58 whose functioning is explained below. A control unit 62 of the telecommunication system 12 contains a processor 64 that processes commands contained in a memory (not shown) and thereby implements central jobs of the telecommunication system 12. The control unit 62 is connected to the signaling unit 50 via a signaling link 66, via which signaling data is sent from the control unit 62 to the signaling unit 50 according to a first, packet-based signaling protocol. The first signaling protocol is defined by the manufacturer of the telecommunication system 12 and serves the purpose of signaling between the telecommunication system 12 and terminal equipment connected directly to the telecommunication system 12, i.e. without protocol conversion. When, for example, a system of the type HICOM of Siemens AG is employed as telecommunication system 12, then the first signaling protocol is the protocol cornet TS.

At its output side, the signaling unit 50 is connected to a logical signaling link 68. Logical means that the data is transmitted via the line 18, but an allocation to the signaling link 68 ensues on the basis of an identifier in the respective data packet. The signaling link 68 ends at the terminal device 10, see FIG. 3. The signaling unit 50 embeds control commands received from the control unit 62 according to a first signaling protocol into control commands according to a second signaling protocol. The second signaling protocol is called Cornet TC and is likewise packet-based. The control commands generated in this way are then sent from the signaling unit 50 to the terminal device 10 via the signaling link 68.

The signaling unit 52 receives signaling data according the second signaling protocol from the terminal device 10 via a logical signaling link 70. Control commands according to the first protocol are taken from this signaling data in the signaling unit 52 and are transmitted to the control unit 62. The signaling link 70 likewise uses the line 18 as a transmission medium.

The voice transmission unit 54 divides voice data transmitted in a voice channel into data packets. The voice transmission unit 54 has its input side connected via a transmission link 74 to an output of the main switching network 75 of the telecommunication system 12. At its input side, the main switching network 75 is connected to the exchange lines 14, so that, dependent on connections switched in the main switching network 75, voice data is transmitted from an exchange line 14 via the transmission link 74 to the voice transmission unit 54. The transmission of the voice data ensues on the exchange lines 14, in the main switching network 75 and on the transmission link 74 according to PCM methods (pulse code modulation) and, thus, in voice channels according to a multiplex method, which is also referred to as TDM (time division multiplex).

Data packets are generated in the voice transmission unit 54 from voice data synchronously transmitted in a voice channel. The data packets are transmitted to the terminal device 10 via a logical transmission link 76 connected to the output of the voice transmission unit 54, being transmitted according to the transmission protocol defined in Standard H.323. The transmission protocol RTP/RTCP (real time protocol/real time control protocol) is employed as transmission protocol. The voice transmission unit 54 has the connection unit 58 allocated to it with whose assistance the voice transmission connection is setup on the logical transmission link 76 and cleared down. The connection unit 58 has its output side connected to a logical signaling link 78 that leads to the terminal equipment 10. Given setup or clear down of the voice connection on the transmission link 76, the connection unit 58 signals on the signaling link 78 according to the signaling protocols defined in the ITU-T Standards H.225.0 and H.245.

The voice transmission unit 56 has its input side connected to a logical transmission link 80 that comes from the terminal device 10. At its output side, the voice transmission unit 56 is connected to a transmission link 82 that leads to the main switching network 75. Voice data in data packets are sent on the transmission link 80 according to Standard H.323 and according to the protocols RTP/RTCP. The voice transmission unit 56 takes the voice data from the received data packets and sends it to the main switching network 75 in a voice channel, i.e. in synchronous voice channels. The voice data is transmitted according to PCM methods on the transmission link 82, in the main switching network 75 and on the exchange lines 14.

The voice transmission unit 56 likewise has the connection unit 58 allocated to it, this serving for the setup or the clear down of the voice transmission connection on the transmission link 80. The connection unit 58 is connected to the signaling unit 50 via a control line 83 and is connected to the signaling unit 52 via a control line 84. In the signaling units 50 and 52, the transmitted commands according to a first signaling protocol are checked to see whether a setup or clear down of a voice transmission connection is required. When such a condition occurs in the signaling unit 50 or 52, then this is signaled to the connection unit 58 via the control line 83 or 84. The connection unit 58 then initiates the setup or clear down of voice transmission connections on the logical transmission links 76 and 80. The setup or clear down of a voice transmission connection thus proceeds from the telecommunication system 12 and not from the terminal device 10.

An interface 86 contains the signaling links 66 and 72 as well as the transmission links 74 and 82. The interface 86 corresponds to the interface to the telecommunication system 12 present at a terminal device of the OPTISET type.

Figure 3:
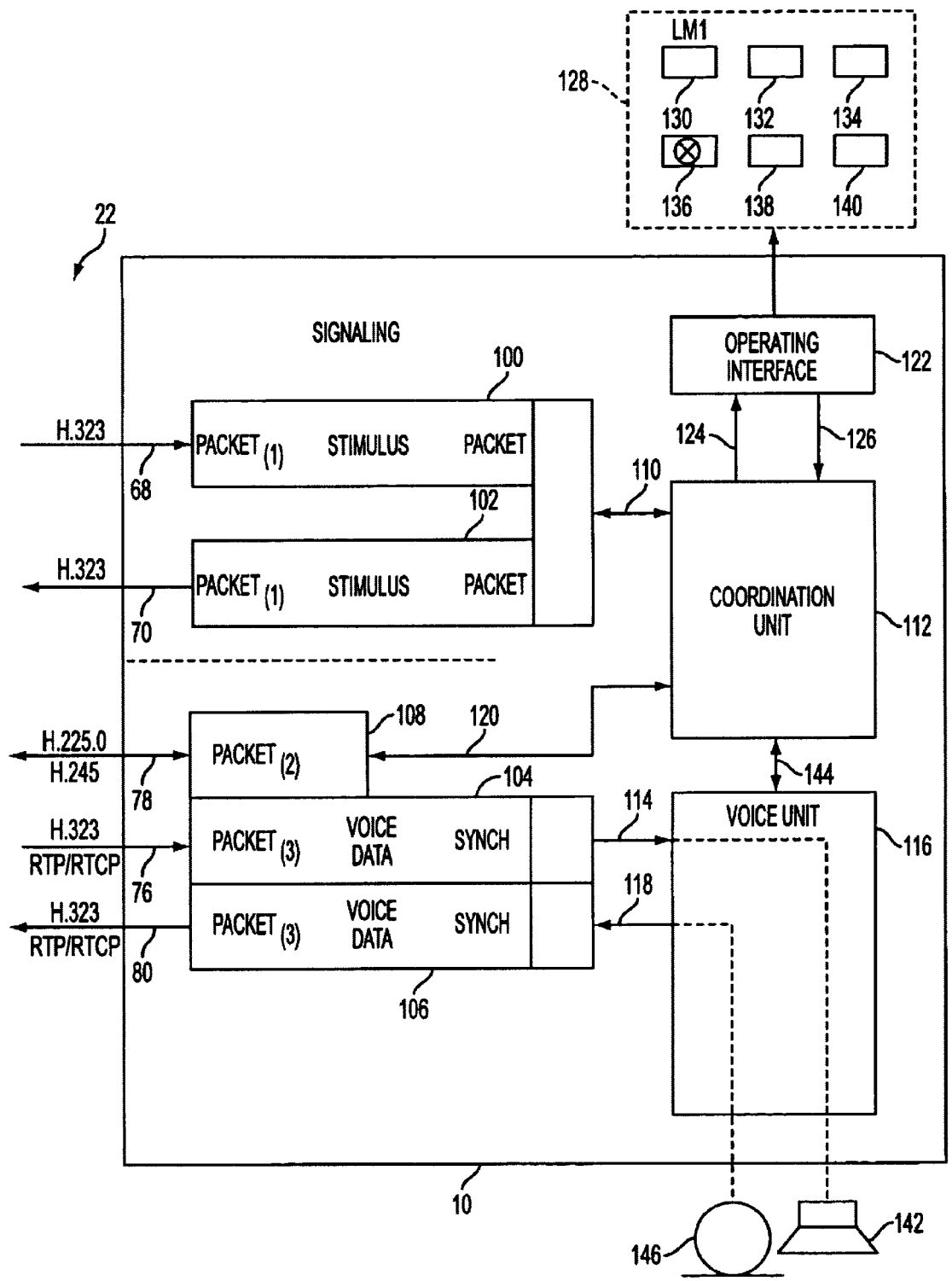
FIG. 3 is a block diagram showing the structure of the terminal device working packet-based.

FIG. 3 shows the structure of the terminal device 10 working packet-based. The terminal device 10 contains two signaling units 100 and 102, two voice transmission units 104 and 106 as well as a connection unit 108. An input side of the signaling unit 100 is connected to the logical signaling link 68. At its output side, the signaling unit 100 is connected via a bidirectional transmission link 110 to a coordination unit 112. In the signaling unit 100, signaling commands according to the first signaling protocol Cornet-TS are taken from signaling commands received from the telecommunication system 12 via the signaling link 68 according to the second signaling protocol and are forwarded to the coordination unit 112 via the transmission link 110.

The signaling unit 102 has its input side connected to the coordination unit 112 via the transmission link 110. At its output side, the signaling unit 102 is connected to the transmission link 70 on which the signaling data are transmitted according to the second signaling protocol. In the signaling unit 102, signaling data transmitted from the coordination unit 112 via the transmission link 110 according to the first signaling protocol are embedded into signaling data according to the second signaling protocol.

The voice transmission unit 104 has its input side connected to the logical transmission link 76. At its output side, the voice transmission unit 104 is connected to a voice unit 116 via an interface 114. Data packets that contain voice data and that were transmitted from the telecommunication system 12 via the logical transmission link 76 are received in the voice transmission unit 104. The voice data contained in the data packets is taken from the data packets in the voice transmission unit 104 and is synchronously transmitted to the voice unit 116 via the interface 114 in a voice channel.

The voice transmission unit 106 has its input side connected to the voice unit 116 via an interface 118. The output of the voice transmission unit 106 is connected to the transmission link 80. In the voice transmission unit 106, the voice data transmitted in a voice channel via the line 118 is divided onto data packets that are then sent to the telecommunication system 12 via the transmission link 80 according to Standard H.323.

At the side toward the telecommunication system 12, the connection unit 108 is connected to the bidirectional signaling link 78. A bidirectional signaling link 120 connects the connection unit 108 and the coordination unit 112. The connection unit 108 receives signaling data according to Standard H.225.0 and H.245 from the telecommunication system 12 and conducts the signaling commands contained therein to the coordination unit 112. Dependent on the control commands received on the signaling link 78, the connection unit 108 is employed for the setup of a voice connection between telecommunication system 12 and terminal device 10. The voice connection is setup via the connection unit 108.

The logical signaling links 68, 70, the logical transmission links 76 and 80 as well as the logical signaling link 78 use the line 22 as a transmission medium. As already mentioned, the line 22 is connected to the line 18 via the Intranet 20.

The coordination unit 112 controls the terminal device 10 and collaborates closely with an operating interface 122, whereby control signals are transmitted from the coordination unit 112 to the operating interface 122 via an interface 124. Control signals are transmitted from the operating interface 122 to the coordination unit 112 via an interface 126. The operating interface 122 contains programs that make it possible to use additional performance functions in the terminal device 10 when they are processed. Operating elements with which the additional performance features can be used are displayed on a picture screen 128 connected to the terminal device 10, being displayed with the assistance of the operating interface 122. FIG. 3 shows three control keys 130, 132 and 134 under which a respective display field 136, 138 or 140 is located.

The control key 130 has a performance feature LM1 "hold call" allocated to it. When this performance feature LM1 is called by an operator with the assistance of a computer mouse, then the display field 136 lying under the control key 130 is shown in an illuminated condition due to the procedures explained below.

The actuation of the control key 130 is signaled from the operating interface 122 to the coordination unit 112 via the interface 126. The coordination unit 112 generates a control command on the line 110 according to the protocol Cornet-TS. This command is "tunneled" via the signaling unit 102, the signaling link 70 and the signaling unit 52 to the control unit 62 of the communication system 12.

The control command generated on the transmission link 110 appears unmodified on the signaling link 72. The control command thereby contains the information "control key 130 pressed". As a result of this control command, the control unit 62 is initiated to part a previously existing connection between a subscriber connected to the telecommunication system 12 and the user of the terminal device 10. A dial tone is supplied into the transmission link 74 for the user of the terminal device 10, this being transmitted via the transmission link 76 and also appearing on the interface 114. The voice unit 116 outputs the dial tone at a loudspeaker 142 of the terminal device 10, so that it is audible to the user.

For the other subscriber, the telecommunication system 12 generates a melody that indicates the waiting condition. The control unit 62 also generates a control command according to the stimulus protocol Cornet-TS that is intended to place the display field 136 into the illuminated condition. This control command is embedded in the signaling unit 50 into a command according to the second signaling protocol and is transmitted to the terminal equipment 10 via the signaling link 68. In the signal unit 100, the control command according to the stimulus protocol is taken from the command according to the second signaling protocol and is forwarded to the coordination unit 112. The coordination unit 112 forwards the command to the operating interface 122. The operating interface 122 causes the display field 136 to be displayed in the illuminated condition on the picture screen 128.

The voice unit 116 is connected to the coordination unit 112 via a bidirectional connection 144. Moreover, the voice unit 116 is connected to a microphone 146 for voice input.

Performance features of the telecommunication system 12 can thus be utilized via the terminal device 10. However, it is likewise possible with the assistance of the terminal equipment to utilize the performance features cited in Standard H.323, for example for the transmission of multimedia data.

Figure 4A:
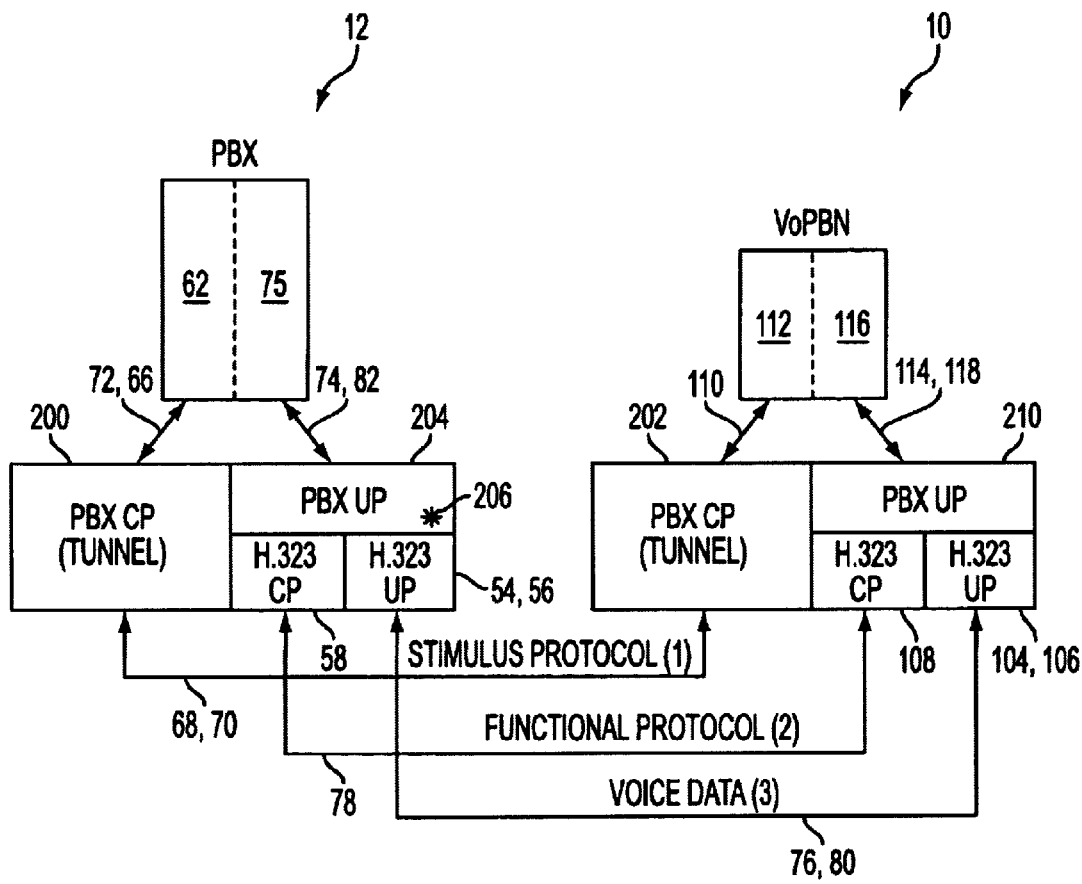
FIG. 4 is a block diagram showing what are referred to as protocol stacks for the telecommunication system and for the terminal device working packet-based.

FIG. 4a shows important protocols that are employed in the telecommunication system 12 and in the terminal device 10. FIG. 4a is thus another way of presenting the procedures explained on the basis of FIGS. 2 and 3. A control level 200 (control plane—CP) relates to all control commands that are processed in the control unit 52. The control commands are transmitted from or to the control unit 62 of the telecommunication system 12 via the signaling links 66 and 72. There is a control level 202 in the terminal device 10. Control commands are transmitted from the control level 202 via the bidirectional transmission link 110 from or to the coordination unit 112. The two control levels 200, 202 are connected to one another via the signaling links 68, 70 on which the control commands according to the stimulus protocol are tunneled.

A payload data level 204 represents the voice data transmitted in the main switching network 75 of the telecommunication system 12. The voice data of the payload data level 204 comes from the main switching network 75 or is transmitted to the main switching network 75 via the transmission links 74 or 82. An asterisk 206 in the payload data level 204 symbolizes the automatic setup or clear down of the voice connections between the line/trunk group 16 and the terminal device 10 in the connection unit 58. The payload data level also includes control commands for setting up or clearing down the voice connection according to protocols H.225.0 and H.245 that have been combined FIG. 4a under the Standard H.323. There is a payload data level 210 at the side of the terminal equipment 10 whose payload data comes from or is sent to the voice unit 116 via the lines 114, 118. For setting up the voice connection, the connection unit 108 is used at the side of the terminal device 10. The connection unit 58 and 108 exchange control commands according to the functional protocol that is defined by the Standards H.225.0 and H.245.

The payload data level 204 (user plane—UP) includes the voice data at the side of the telecommunication system 12 that is transmitted via the voice transmission units 54 and 56. At the side of the terminal device 10, the voice data is transmitted with the assistance of the voice transmission units 104 and 106. The voice data are transmitted between the terminal device 10 and telecommunication system 12 via the transmission link 76 and 80 according to the protocol H.323 (RTP/RTCP).

Figures 4B, 4C, 4D:
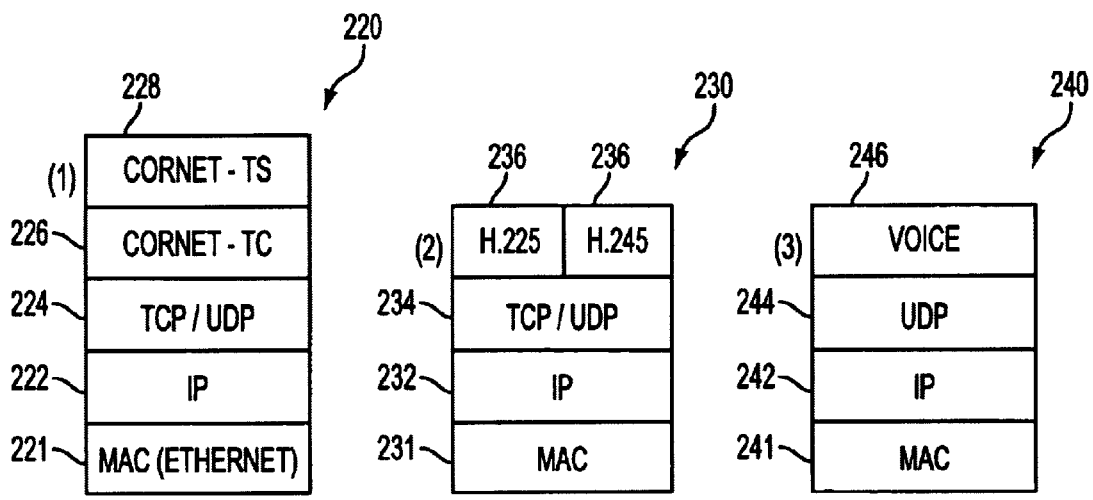

FIG. 4b shows what is referred to as a protocol stack 220 for the transmission on the signaling links 68, 70. A MAC protocol "medium access control" is employed as a protocol of the lowest layer. In the example, an Ethernet is employed as transmission medium. The Internet protocol IP is employed as the next-higher protocol, see reference character 222. The transmission is implemented secured with the assistance of a protocol TCP (transmission control protocol) or unsecured with the assistance of the protocol UDP (user data gram protocol), see reference character 224. The tunneled protocols Cornet-TC and the tunneled protocol Cornet-TS lie above this, see reference characters 226 and 228.

FIG. 4c shows a protocol stack 230 for the transmission on the logical signaling link 78. Lower protocol layers 231, 232 and 234 coincide with the protocol layers 221, 222 and 224. A protocol layer 236 lying above the protocol layer 234 is formed by the protocols according to Standards H.225.0 and H.245.

FIG. 4d shows a protocol stack 240 for the transmission via the transmission links 76 and 80. Lower protocol layers 241 and 242 coincide with the protocol layers 221 and 222. A protocol layer 244 lying above the protocol layer 242 relates to the protocol UDP. After this, there follows a protocol layer 245, which relates to the protocol RTP/RTCP (Real Time Protocol/Real Time Control Protocol), which is addressed [or: operated] in Standard H.323. In a protocol layer 246 that lies thereover, a format is specified for the voice data that is transmitted between telecommunication system 12 and terminal device 10.

Although modifications and changes may be suggested by those skilled in the art, it is the intention of the inventors to embody within the patent warranted hereon all changes and modifications as reasonably and properly come within the scope of their contribution to the art.

What is claimed is:

1. A method for operating a switching device, said method comprising the steps of:

switching data in a telecommunication network with said switching device, said switching device having a first control unit for controlling said switching device;

employing a first protocol for signaling control commands between the first control unit and a first terminal unit, said first control unit being connected to a second terminal unit via an interface unit;

employing a second protocol different from said first protocol for signaling control commands between said interface unit and said second terminal unit; and performing at least one of the following:

embedding control commands according to the first protocol received at said interface unit from said control unit into control commands according to said second protocol and sending said embedded control commands to said second terminal unit; and extracting embedded control commands according to the first protocol from control commands according to said second protocol received at said interface unit from said second terminal unit and sending the extracted control commands to said control unit.

2. The method according to claim 1, wherein said first protocol is a stimulus protocol; and said method further comprising the steps of:

reporting statuses of operating elements of said second terminal unit to said control unit with assistance of said first protocol; and setting statuses of signal elements of said second terminal unit transmitted from said control unit with assistance of said first protocol.

3. The method according to claim 1, wherein said second protocol is a functional protocol dependent on a function selected in said second terminal unit and being executed by said second terminal unit, said second protocol requiring a command defining said function.

4. The method according to claim 1, further comprising the steps of:

searching said signaled control commands for control commands in said interface unit that require a setup or a clear down of a payload data connection between said switching device and said second terminal unit; and upon finding such signaled control command, initiating said setup or said clear down of said payload data connection with said interface unit.

5. The method according to claim 4, further comprising the steps of:

distributing said data transmitted from said switching device in a first data channel in data packets to said second terminal unit according to a transmission protocol defined for said second terminal unit;

unpacking said data packets transmitted from said second terminal device in said interface unit; and forwarding said unpacked data to said switching device in a second data channel.

6. The method according to claim 5, wherein said data is voice data for transmission of voice signals.

7. The method according to claim 1, wherein said second terminal unit operates according to ITU-T Standard H.323; and wherein said switching device is a telecommunication system in a line switched center telephone network wherein voice data is transmitted in voice channels.

8. An interface unit comprising:

a first port being connectable to a control unit of a switching device to which signaling commands are transmittable according to a first protocol being employed between said control unit and a first terminal unit, said first terminal unit being directly connected to said switching device;

a second port being connectable to a data transmission network to which signaling commands are transmittable according to a second protocol being employed in said data transmission network and being different from said first protocol; and a conversion unit for converting signaling commands according to said first protocol into signaling commands according to said second protocol and for converting signaling commands according to said second protocol into signaling commands according to said first protocol, said conversion unit embedding control commands according to said first protocol into control commands according to said second protocol and/or extracting embedded control commands according to said first protocol from control commands according to said second protocol.

9. A switching device having a control unit, said switching device comprising:

an interface unit for tunneling signaling commands between said switching device and a first terminal unit, said interface unit including:

a first port being connectable to a control unit of a switching device to which signaling commands are transmittable according to a first protocol being employed between said control unit and a first terminal unit, said first terminal unit being directly connected to said switching device;

a second port being connectable to a data transmission network to which signaling commands are transmittable according to a second protocol being employed in said data transmission network and being different from said first protocol; and a conversion unit for converting signaling commands according to said first protocol into signaling commands according to said second protocol and for converting signaling commands according to said second protocol into signaling commands according to said first protocol, said conversion unit embedding control commands according to said first protocol into control commands according to said second protocol and/or extracting embedded control commands according to said first protocol from control commands according to said second protocol.

10. A computer readable medium storing a program to control a computer to perform a process for operating a switching device, the process comprising:

switching data in a telecommunication network with said switching device, said switching device having a first control unit for controlling said switching device;

employing a first protocol for signaling control commands between the first control unit and a first terminal unit, said first control unit being connected to a second terminal unit via an interface unit;

employing a second protocol different from said first protocol for signaling control commands between said interface unit and said second terminal unit; and performing at least one of the following:

embedding control commands according to the first protocol received at said interface unit from said control unit into control commands according to said second protocol and sending said embedded control commands to said second terminal unit; and extracting embedded control commands according to the first protocol from control commands according to said second protocol received at said interface unit from said second terminal unit and sending the extracted control commands to said control.

11. A terminal unit for the operation of a switching device, said terminal unit comprising:

a signaling unit to generate signaling commands according to a first protocol that is employed in the switching device, the signaling unit being directly connectable to a control unit of the switching device to transmit signaling commands between the control unit and the terminal unit;

a connection connectable to a data transmission network at which signaling commands are transmitted according to a second protocol different from the first protocol; and a conversion unit to perform at least one of embedding signaling commands according to the first protocol into signaling commands according to the second protocol and extracting embedded signaling commands according to the first protocol from signaling commands according to the second protocol.

12. A method for operating a switching device, said method comprising the steps of:

connecting a terminal device to said switching device with the assistance of an interface unit for protocol conversion; and tunneling signaling commands corresponding to a signaling protocol employed in said switching device between said interface unit and said terminal device.

* * * * *